US012347637B2

(12) United States Patent
Edwards et al.

(10) Patent No.: US 12,347,637 B2
(45) Date of Patent: Jul. 1, 2025

(54) LIGHTED VISUAL TRIP INDICATOR MODULE FOR CIRCUIT BREAKERS

(71) Applicant: Schneider Electric USA, Inc., Andover, MA (US)

(72) Inventors: Benjamin W. Edwards, Andover, MA (US); Ezequiel Salas Zamarripa, Andover, MA (US); Tannan Whidden Winter, Andover, MA (US); Jodi Marie Palmer, Andover, MA (US); Gerardo Torres Guzman, Andover, MA (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 17/918,693

(22) PCT Filed: Oct. 29, 2021

(86) PCT No.: PCT/US2021/057287
§ 371 (c)(1),
(2) Date: Oct. 13, 2022

(87) PCT Pub. No.: WO2022/094235
PCT Pub. Date: May 5, 2022

(65) Prior Publication Data

US 2023/0090370 A1 Mar. 23, 2023

Related U.S. Application Data

(60) Provisional application No. 63/108,121, filed on Oct. 30, 2020.

(51) Int. Cl.
*H01H 73/14* (2006.01)
*H01H 71/04* (2006.01)

(52) U.S. Cl.
CPC ............ *H01H 73/14* (2013.01); *H01H 71/04* (2013.01); *H01H 2071/042* (2013.01)

(58) Field of Classification Search
CPC .. H01H 73/14; H01H 71/04; H01H 2071/042; H01H 9/18; H01H 83/20
(Continued)

(56) References Cited

U.S. PATENT DOCUMENTS 4,706,073 A * 11/1987 Vila Masot ............ H01H 71/04 337/206
5,847,913 A * 12/1998 Turner .................. G01R 31/52 361/115
(Continued)

FOREIGN PATENT DOCUMENTS

WO 03073180 A1 9/2003
WO 2013188229 A1 12/2013

OTHER PUBLICATIONS

International Search Report and Written Opinion mailed Jan. 31, 2022 in International Application No. PCT/US2021/057287, 18 pages.
(Continued)

*Primary Examiner* — Thienvu V Tran
*Assistant Examiner* — Sreeya Sreevatsa
(74) *Attorney, Agent, or Firm* — Troutman Pepper Locke LLP

(57) ABSTRACT

A visual trip indicator for a circuit breaker is disclosed. The electronic components of a visual trip indicator are enclosed in a module that attaches to the circuit breaker handle or within pocket defined in the circuit breaker housing. The visual trip indicator includes a light source operated by a state machine which clearly indicates which circuit breaker, of a group of circuit breakers or in a poorly illuminated enclosure, is tripped. The visual trip indicator also indicat-
(Continued)

ing, by a coded light signal, the approximate remaining life of an independent power supply powering the visual trip indicator.

27 Claims, 17 Drawing Sheets

(58) Field of Classification Search
USPC .......................................................... 361/42
See application file for complete search history.

(56) References Cited

U.S. PATENT DOCUMENTS

| | | | | |
|---|---|---|---|---|
| 6,603,469 | B1 * | 8/2003 | Gettemy | G06F 1/3265 345/102 |
| 9,658,264 | B2 * | 5/2017 | Beiner | H02J 13/00 |
| 2003/0187520 | A1 * | 10/2003 | Pearlman | H02J 13/00009 700/2 |
| 2004/0218379 | A1 * | 11/2004 | Barton | F21S 9/022 362/20 |
| 2009/0140871 | A1 * | 6/2009 | Titus | H02H 3/04 345/173 |
| 2009/0193901 | A1 * | 8/2009 | Land, III | H02H 1/0023 73/705 |
| 2009/0242367 | A1 * | 10/2009 | Bruel | H01H 9/167 200/308 |
| 2013/0021163 | A1 * | 1/2013 | Watford | H02H 3/046 340/638 |
| 2013/0329331 | A1 * | 12/2013 | Erger | H01H 71/04 361/102 |
| 2017/0098520 | A1 * | 4/2017 | Mittelstadt | G01D 5/145 |
| 2018/0136288 | A1 | 5/2018 | Wolfe et al. | |
| 2019/0252135 | A1 * | 8/2019 | Roby | G08C 23/04 |

OTHER PUBLICATIONS

Extended European Search Report and Search Opinion dated Feb. 26, 2024 for European Application No. EP21887612.6, 9 pages.

* cited by examiner

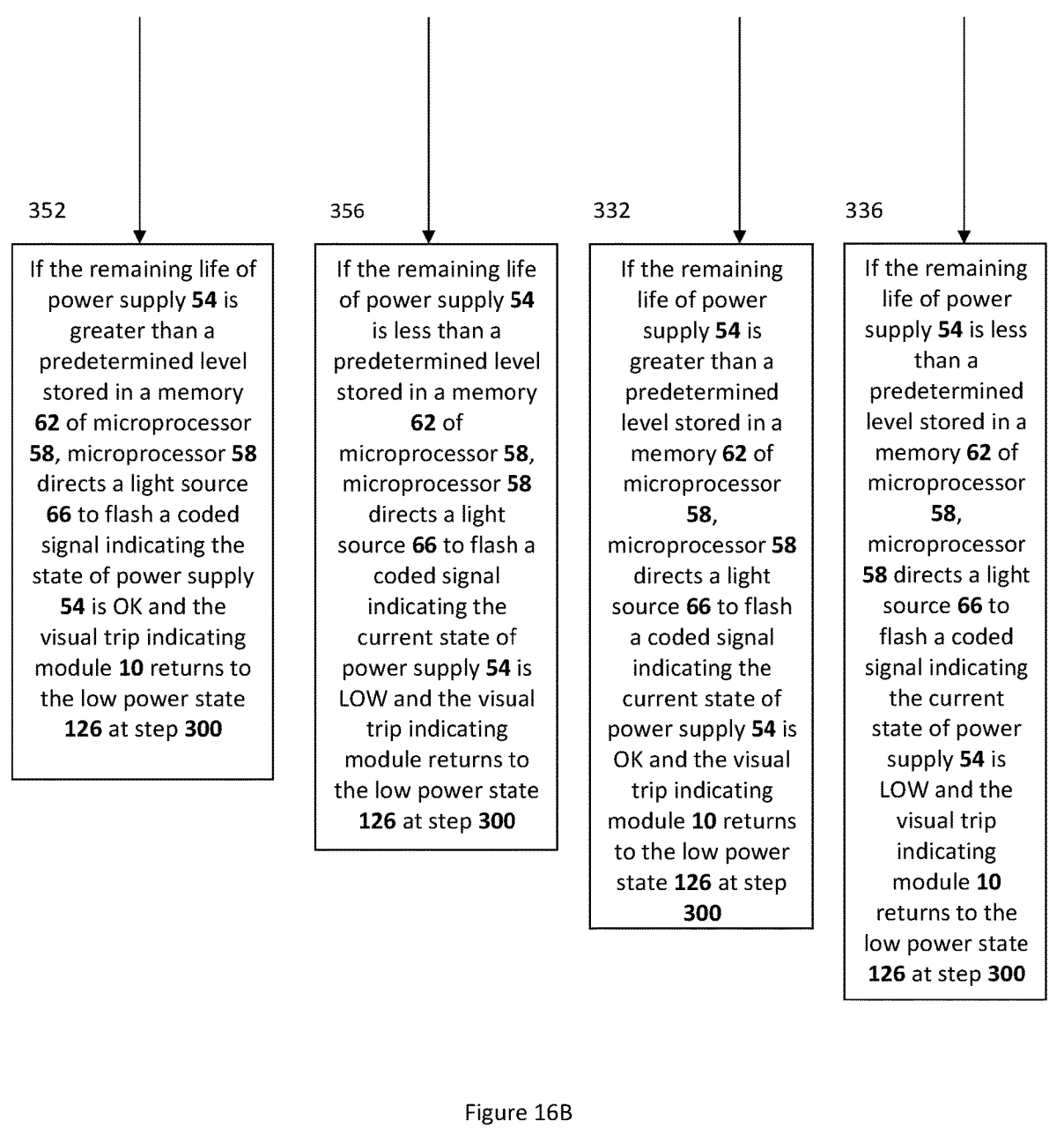

352

If the remaining life of power supply 54 is greater than a predetermined level stored in a memory 62 of microprocessor 58, microprocessor 58 directs a light source 66 to flash a coded signal indicating the state of power supply 54 is OK and the visual trip indicating module 10 returns to the low power state 126 at step 300

356

If the remaining life of power supply 54 is less than a predetermined level stored in a memory 62 of microprocessor 58, microprocessor 58 directs a light source 66 to flash a coded signal indicating the current state of power supply 54 is LOW and the visual trip indicating module returns to the low power state 126 at step 300

332

If the remaining life of power supply 54 is greater than a predetermined level stored in a memory 62 of microprocessor 58, microprocessor 58 directs a light source 66 to flash a coded signal indicating the current state of power supply 54 is OK and the visual trip indicating module 10 returns to the low power state 126 at step 300

336

If the remaining life of power supply 54 is less than a predetermined level stored in a memory 62 of microprocessor 58, microprocessor 58 directs a light source 66 to flash a coded signal indicating the current state of power supply 54 is LOW and the visual trip indicating module 10 returns to the low power state 126 at step 300

Figure 16B

LIGHTED VISUAL TRIP INDICATOR MODULE FOR CIRCUIT BREAKERS

TECHNICAL FIELD

The present disclosure relates to circuit protection devices, and more particularly, to a visual trip indicator module configured to selectively activate a light emitting device to indicate a current state of a circuit breaker.

BACKGROUND

In the past, a visual inspection of circuit breaker operating handle positions was the only method of determining which breaker within a group of circuit breakers was tripped. This can be difficult because the tripped position of the circuit breaker operating handle is very close to the off position of the circuit breaker operating handle. This is especially true when the breakers are in large panels or in an area that is not well lighted. Some manufacturers have provided mechanical flags to indicate a tripped breaker, but flags may also be difficult to see, particularly in low light areas.

BRIEF DESCRIPTION OF THE DRAWINGS

FIGS. 16A-16B depict a flow chart illustrating a method for determining the circuit breaker's state and indicating that state by initiating a coded light signal from the light source, according to one embodiment described herein.

Figure 1:
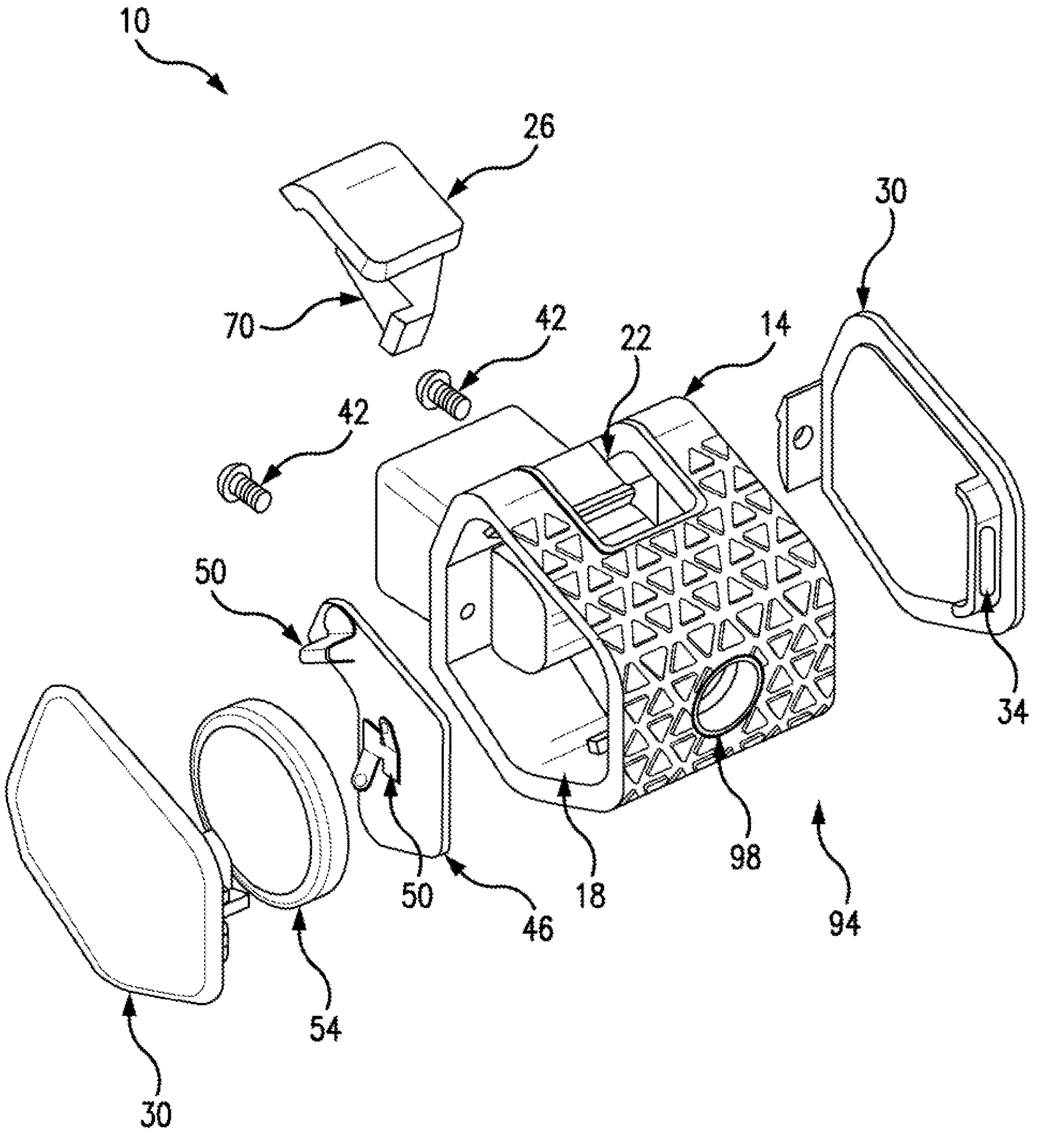
FIG. 1 is an exploded view of a visual trip indication module, according to one embodiment described herein.

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

It is desirable for users (e.g., homeowners, technicians, engineers, etc.) to be able to quickly identify the state of a circuit breaker and to quickly and easily identify which circuit breaker(s) within a group of circuit breakers are tripped. Conventionally some circuit breaker manufacturers have included a light indicator in the circuit breaker housing. Depending on the location of the light indicator in the circuit breaker housing and the enclosure in which the circuit breaker is mounted, the light indicator may not be easily seen. These light indicators require some type of mechanical and/or electrical apparatus inside the circuit breaker housing for detecting the tripped state of the circuit breaker, obtaining power for the light indicator from the line side of the circuit breaker and fixturing the indicator light in the circuit breaker housing. Therefore, additional electrical and mechanical components and modifications to the circuit breaker housing increase the cost of the circuit breaker and/or require that circuit breakers with light indicators be special orders.

Embodiments described herein provide a visual trip indication module that does not contain any electrical or mechanical components inside the circuit breaker housing. Moreover, embodiments provide a visual trip indication module that has its own independent power source and can be located on the end of the circuit breaker handle, which is a highly visible part of the circuit breaker. In one or more embodiments described herein, the visual trip indication module can be installed as a last step in manufacturing the circuit breaker or can be added to existing circuit breakers in the fields as a retrofit with minimal assembly required.

Figure 2:
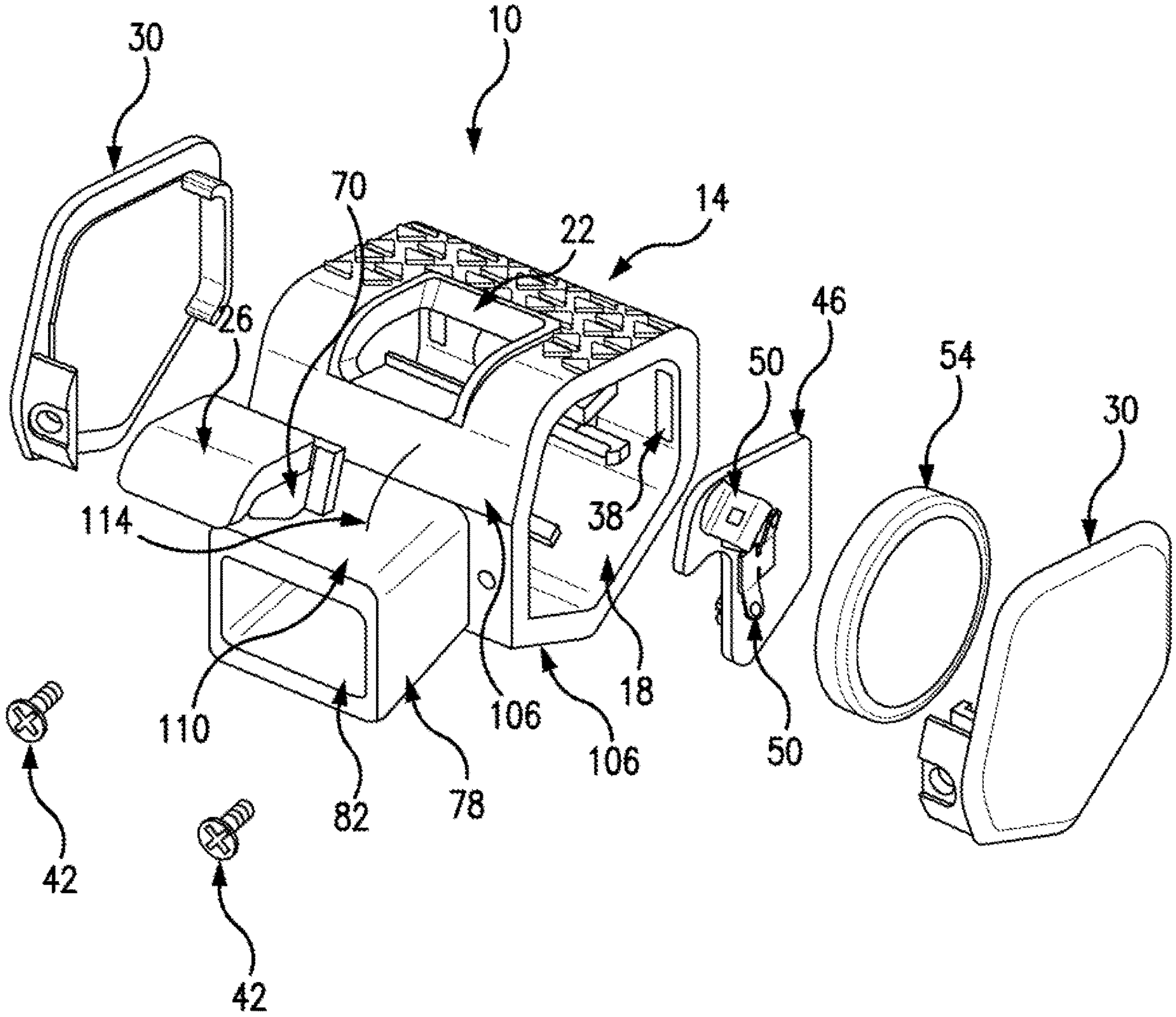
FIG. 2 is an exploded view of a visual trip indication module, according to one embodiment described herein.

Referring to FIGS. 1 and 2, the visual trip indicator module 10 includes a module housing 14. The module housing 14 defines an aperture 18 and a visible indicator pocket 22, which intersects the aperture 18 and receives a visible indicator lens 26. The aperture 18 can pass through the module housing 14 and is closed at each end by aperture covers 30. Each aperture cover 30 is secured to the module housing 14 by a an aperture cover rib 34, which is received in an aperture cover rib groove 38 defined in the aperture 18 of the module housing 14 and a screw 42. A printed circuit board (PCB) 46, is restrained in the aperture 18. The PCB 46 has power supply terminals 50 attached to one side for connecting to an independent power supply 54 such as a button battery of the type generally expected to have a 10 year life. A secure electrical connection between the independent power supply 54 and PCB 46 is obtained by pressure from the installed passage cover 30 against the independent power supply 54, power supply terminals 50 and PCB 46.

Also attached to the PCB 46 are a microprocessor 58 with a memory 62 and a light source 66 such as a light emitting diode (LED). The light source 66 is positioned on the PCB 46 such that it is immediately adjacent a portion of the visible indicator lens 26 or a portion of the visible indicator lens 26 acting as a light pipe 70. The visible indicator lens 26 is located on the visual trip indicator module 10 such that it is clearly visible in a large or poorly illuminated electrical panel and acts as a circuit breaker locater to maintenance personnel looking for a tripped circuit breaker. A waking device 74 and a sensing device 76 can also be located on the PCB 46 or in the aperture 18 adjacent to the PCB 46. The waking device 74 and the sensing device 76 can be mechanical devices, electronic devices or of a combination of mechanical and electronic devices. In some cases, the waking device 74 and sensing device 76 are the same device or a combination of multiple devices. All of the electrical components being capable of near zero current draw during a low power state 126, which the visual trip indicator module 10 is in except during switching and tripping events. The module housing 14 also defines a circuit breaker handle connector 78, which extends outward from the housing 14 and includes a circuit breaker handle receiving aperture 82.

Figure 3:
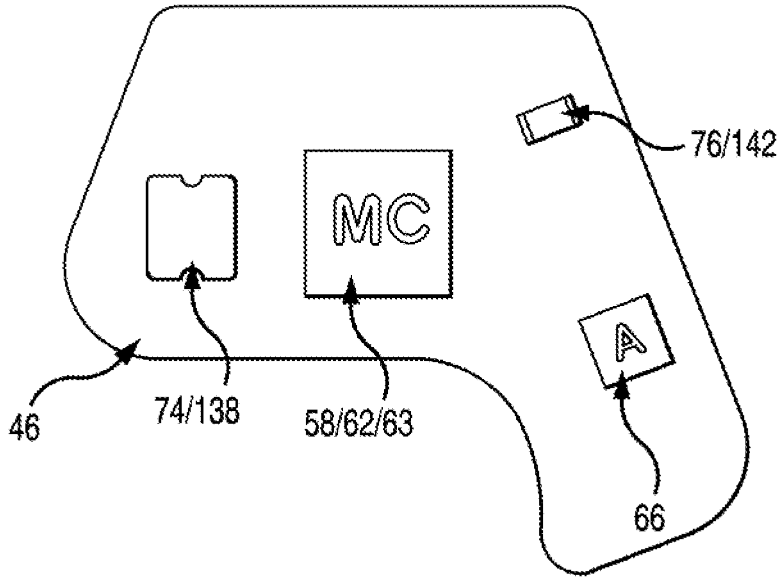
FIG. 3 illustrates an outside view of an aperture cover, according to one embodiment described herein.
Figure 4:
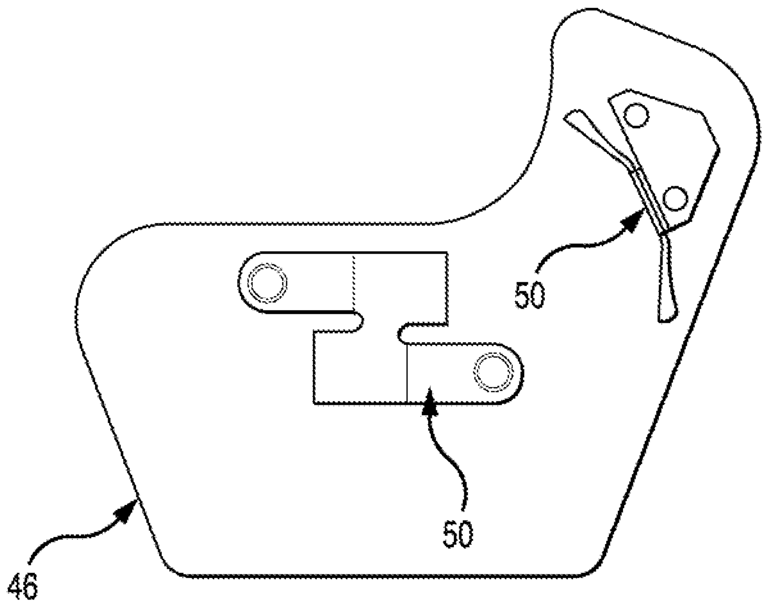
FIG. 4 illustrates an inside view of an aperture cover, according to one embodiment described herein.

FIGS. 3 and 4 illustrate in more detail one embodiment of the PCB 46 wherein the power supply terminal 50 is located on one side and the microprocessor 58 memory 62, light source 66, waking device 74 and accelerometer 142 on the other side. In other embodiments described below some of these elements may be located in or on other parts of the visual trip indicator module 10.

Figure 5:
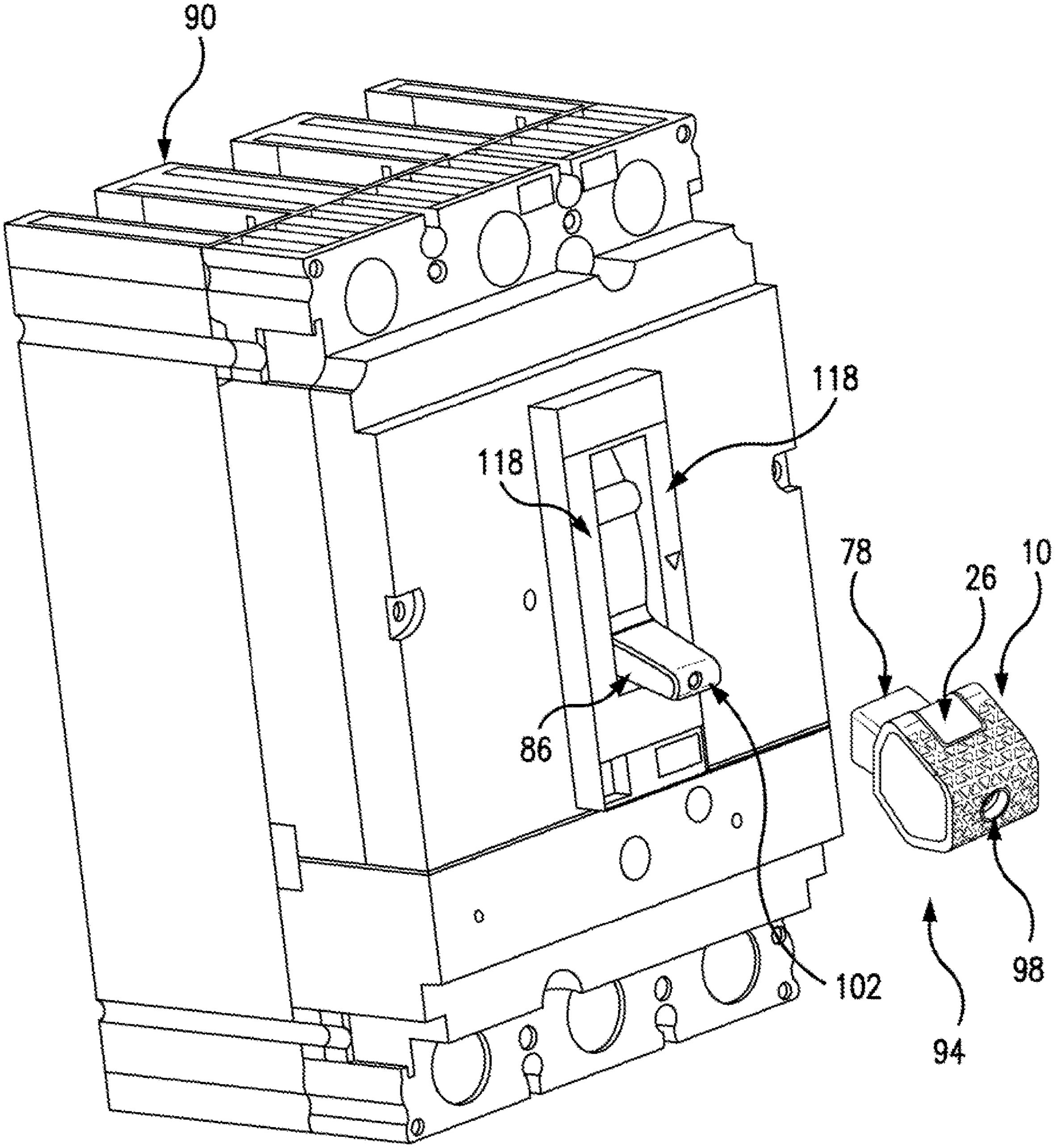
FIG. 5 illustrates a visual trip indication module in front of a circuit breaker and positioned for installation on the circuit breaker handle, according to one embodiment described herein.
Figure 6:
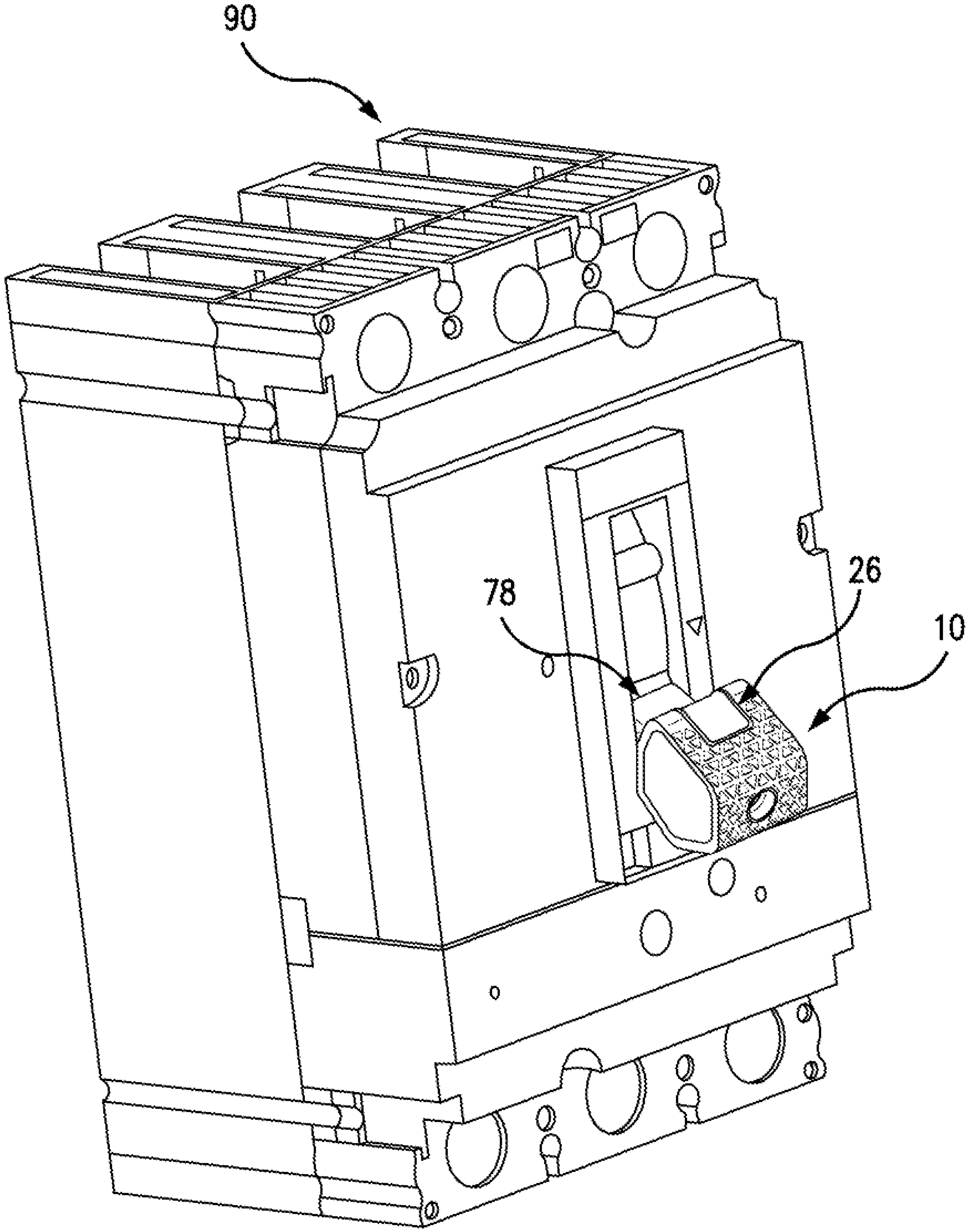
FIG. 6 illustrates a visual trip indication module installed on the circuit breaker handle, according to one embodiment described herein.
Figure 8:
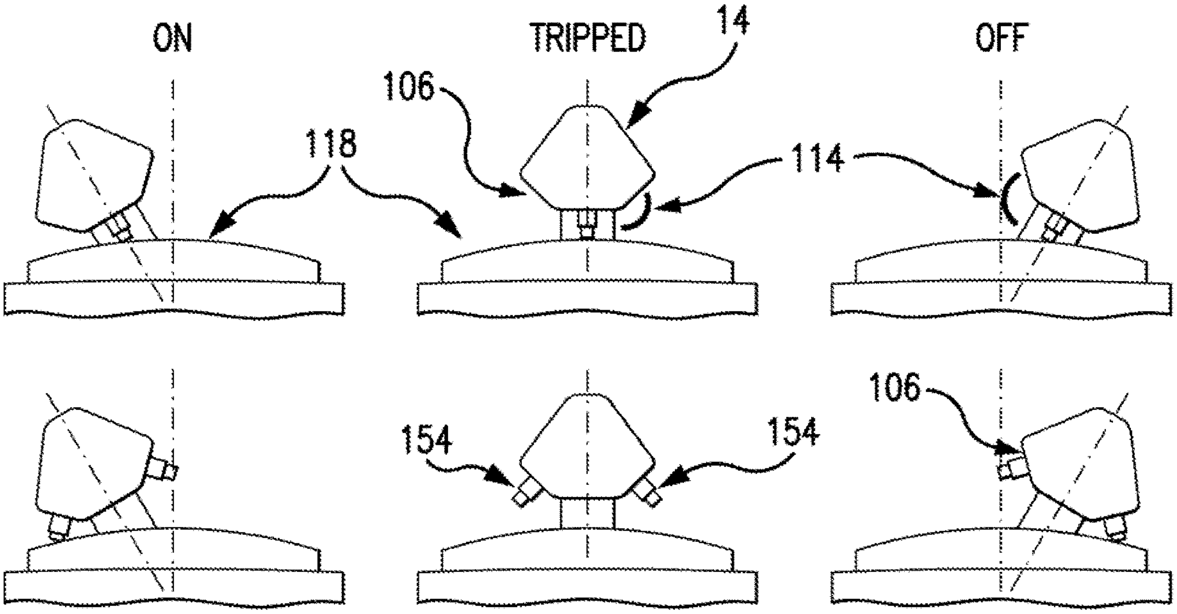
FIG. 8 illustrates the positions of a single microswitch and two microswitches in each of the ON, TRIPPED and OFF positions, according to one embodiment described herein.
Figure 9:
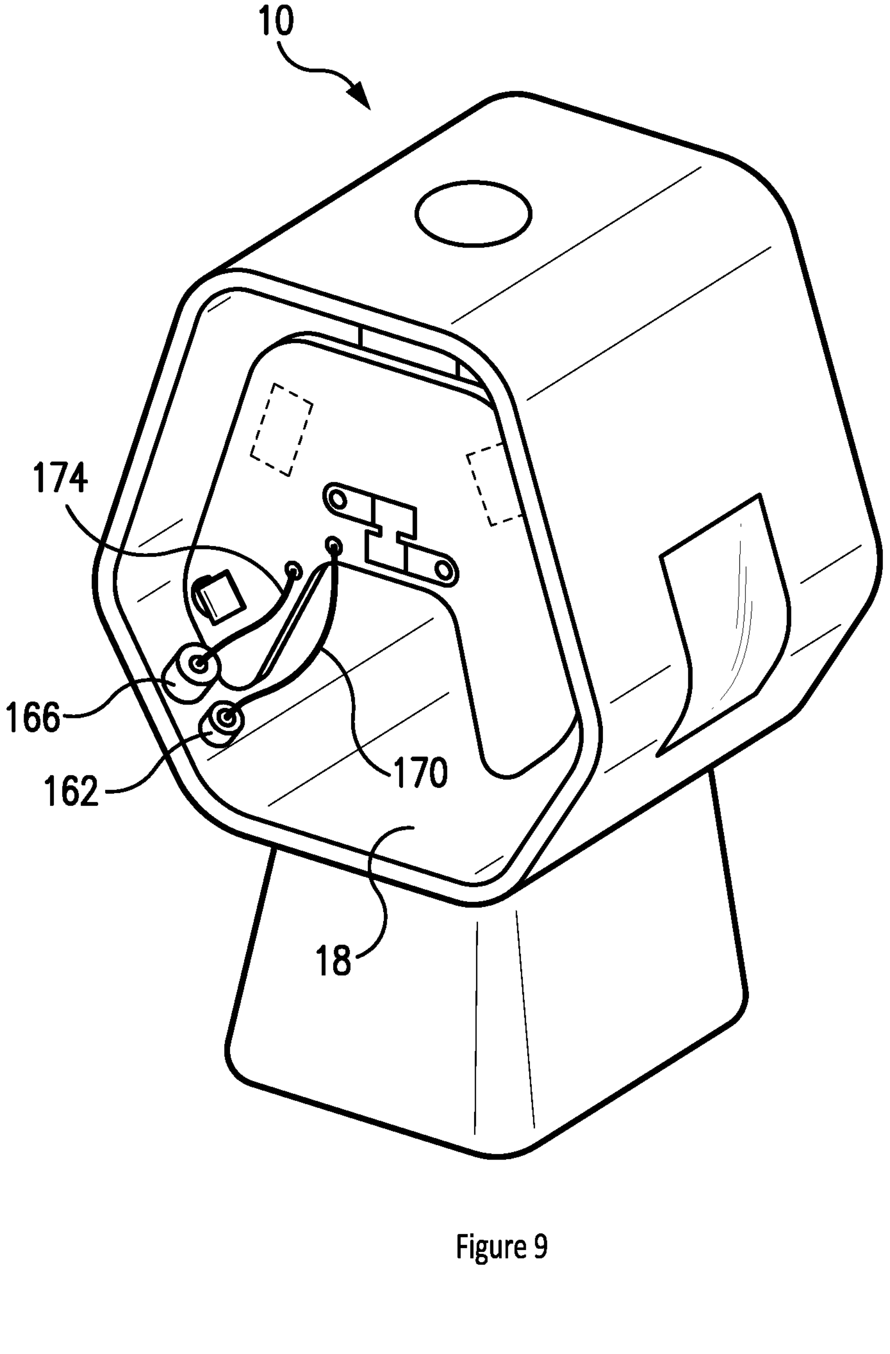
FIG. 9 illustrates a sensing device comprising a combination of a light source, a light reflector, and a light detector, according to one embodiment described herein.
Figure 10:
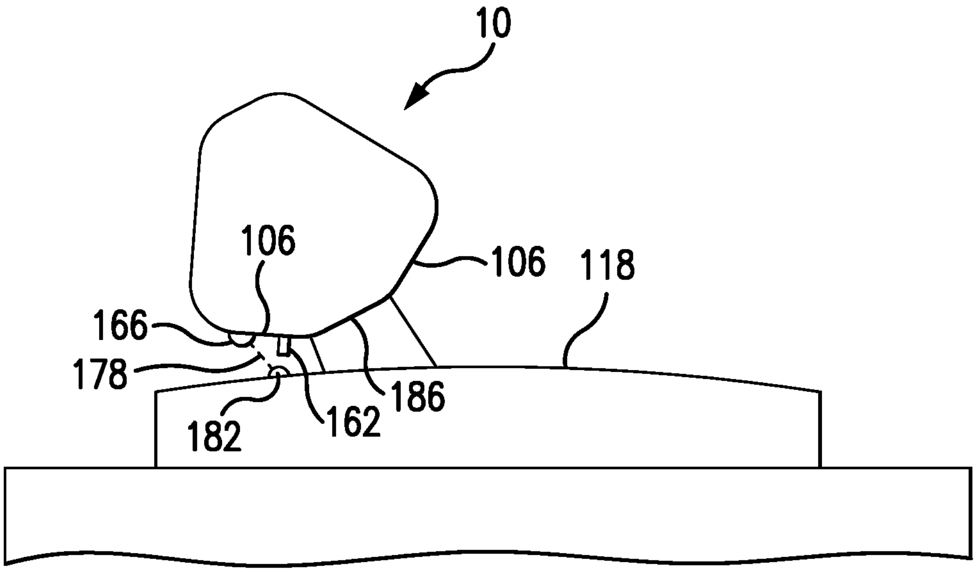
FIG. 10 illustrates a sensing device comprising a combination of a light source, a light reflector, and a light detector, according to one embodiment described herein.
Figure 11:
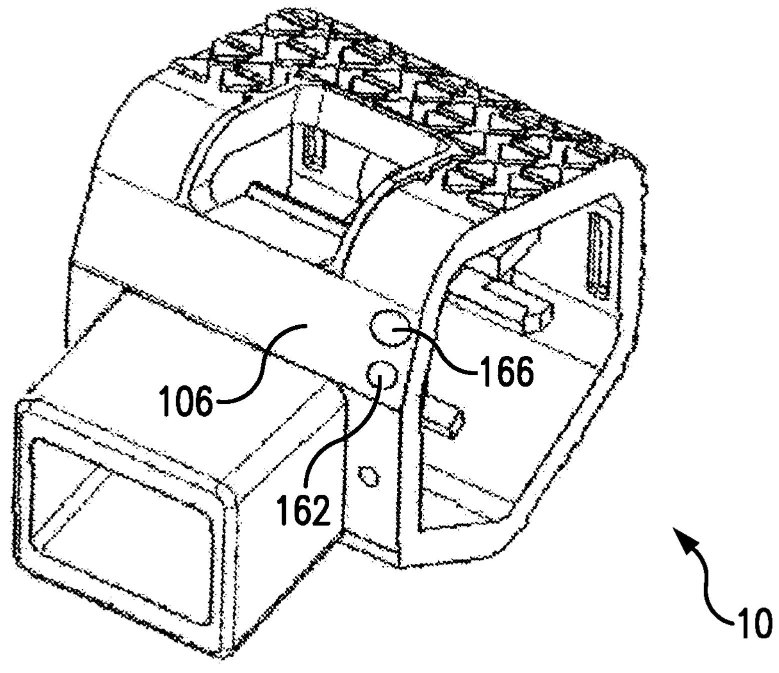
FIG. 11 illustrates a sensing device comprising a combination of a light source, a light reflector, and a light detector, according to one embodiment described herein.
Figure 12:
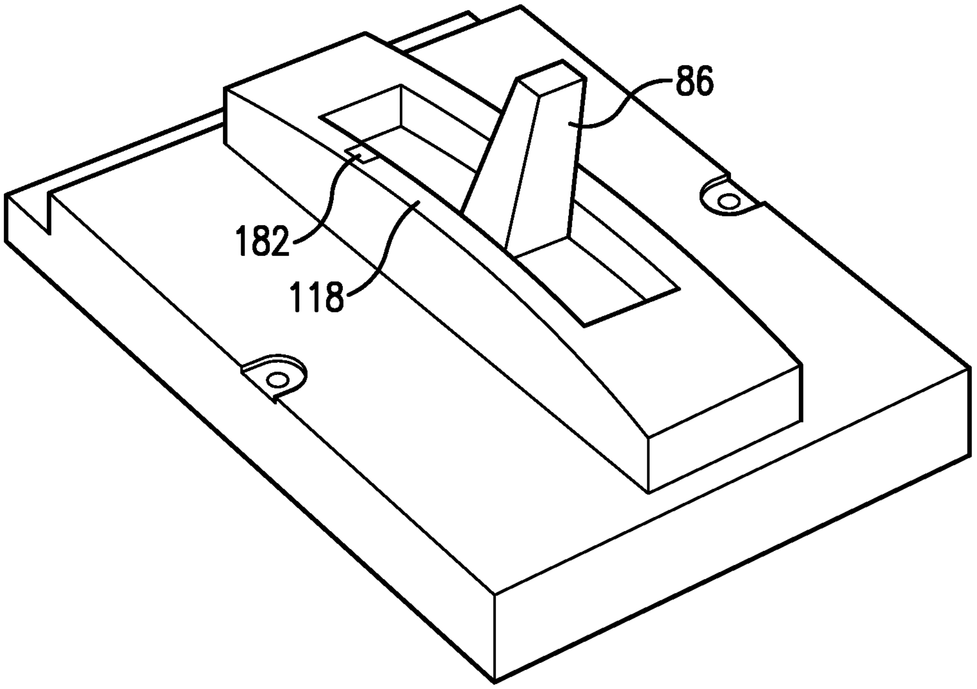
FIG. 12 illustrates a sensing device comprising a combination of a light source, a light reflector, and a light detector, according to one embodiment described herein.

Referring now to FIGS. 5 and 6, the circuit breaker handle 86 of circuit breaker 90 is slidably received in the circuit breaker handle receiving aperture 82 (shown in FIG. 2) of the circuit breaker handle connector 78 and secured by a screw 94, which passes through an attaching screw opening 98 in the module housing 14 and is received in a threaded insert 102 located in the circuit breaker handle 86. As shown in FIGS. 2 and 8, the angular surfaces 106 and the adjacent side 110 of the circuit breaker handle connector 78 form an obtuse angle 114 which must be large enough to prevent any interference between the angular surfaces 106 and the circuit breaker cover 118 that would prevent the circuit breaker handle 86 and attached visual trip indicator module 10 from reaching their full ON or OFF position.

Figure 16A:
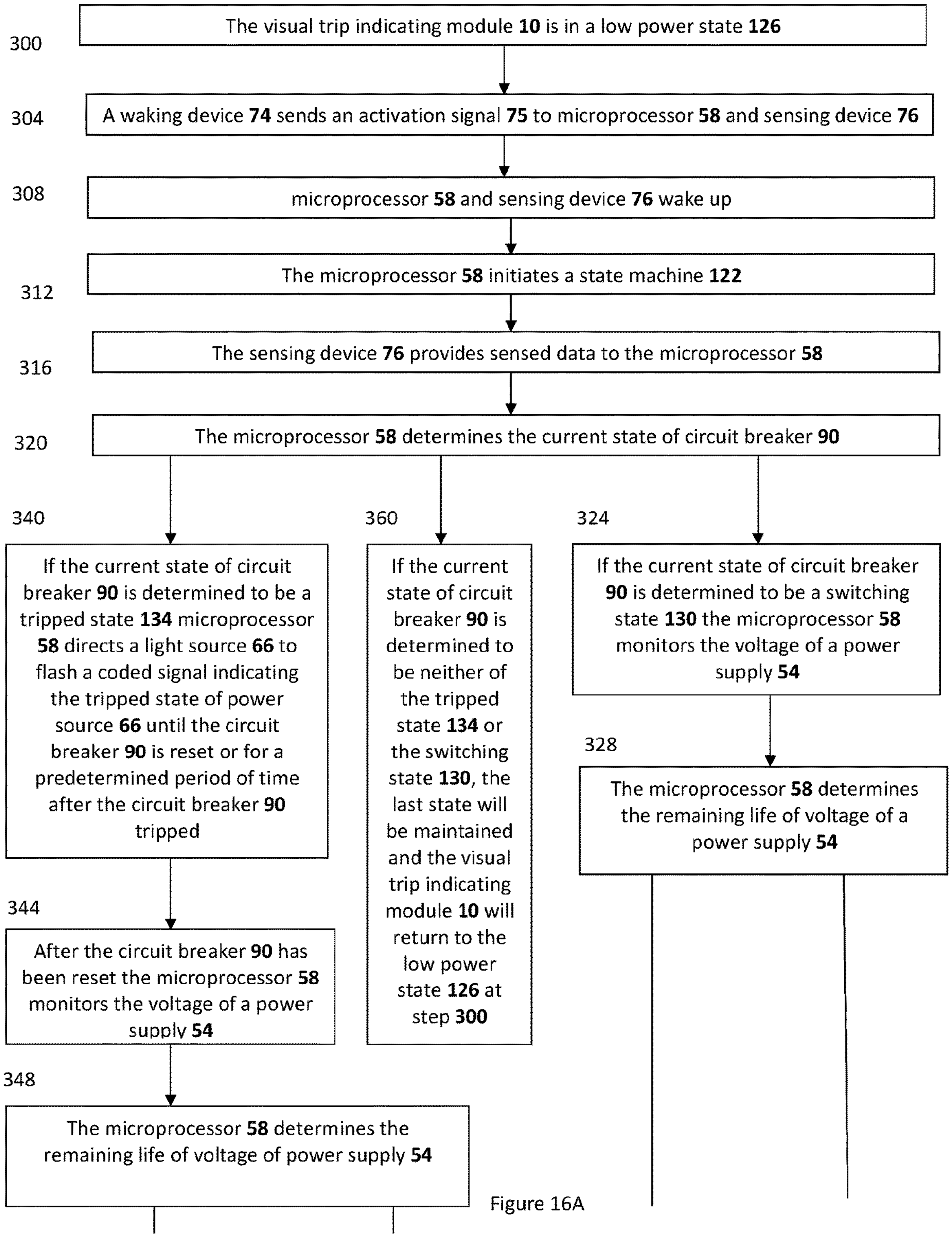
Figure 17A:
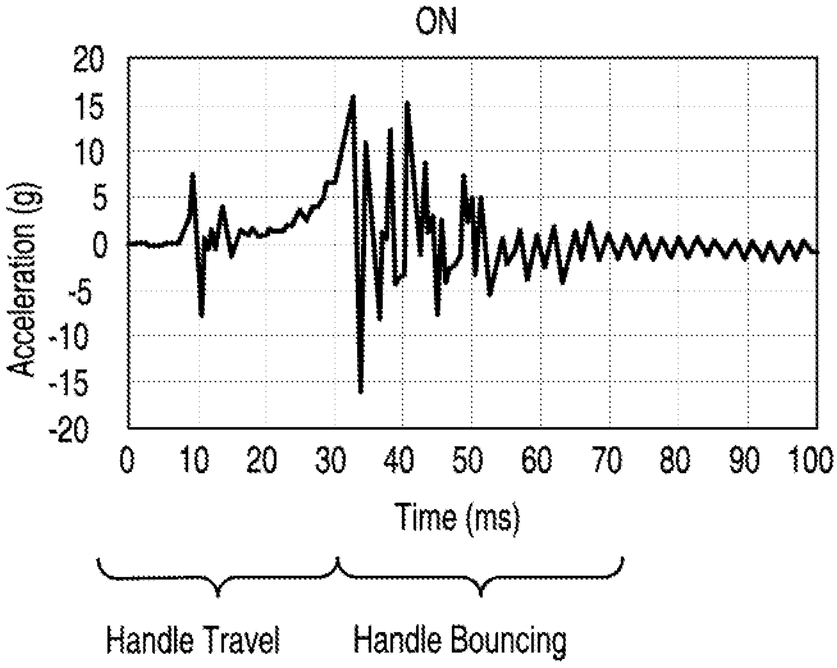
FIGS. 17A-17D illustrate acceleration data indicating switching from OFF to ON, ON to OFF, TRIPPED and RESET, according to one embodiment described herein.
Figure 17B:
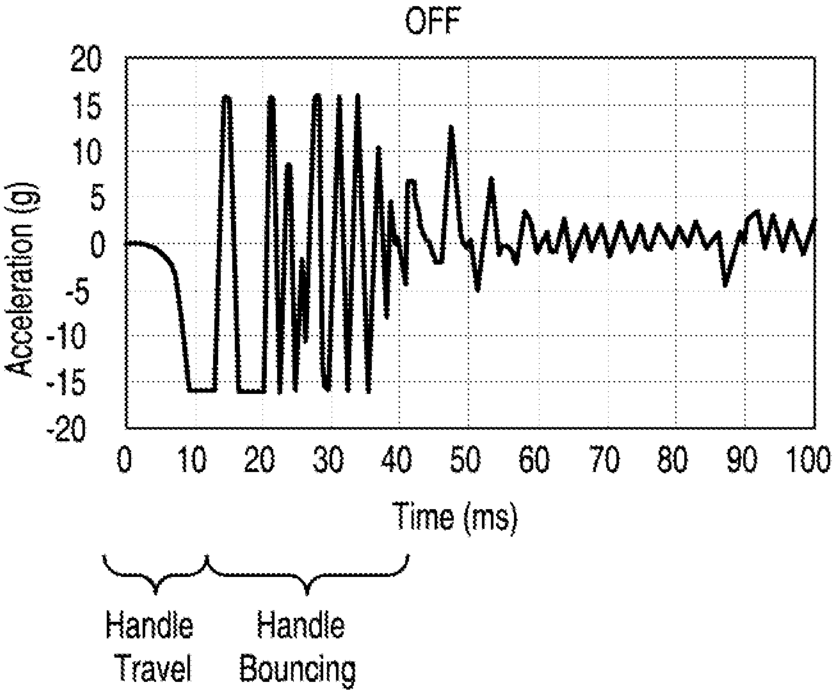
Figure 17C:
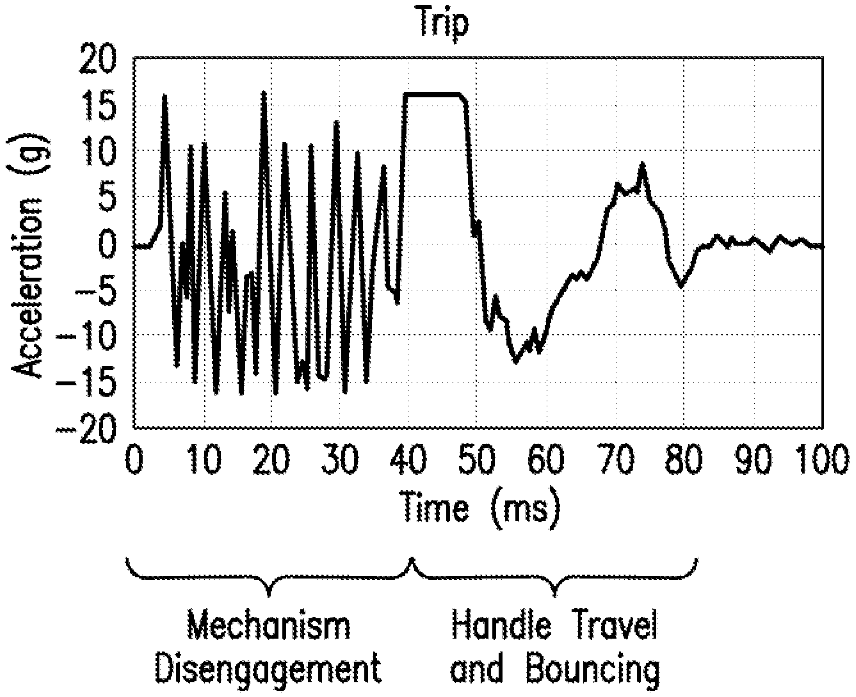
Figure 17D:
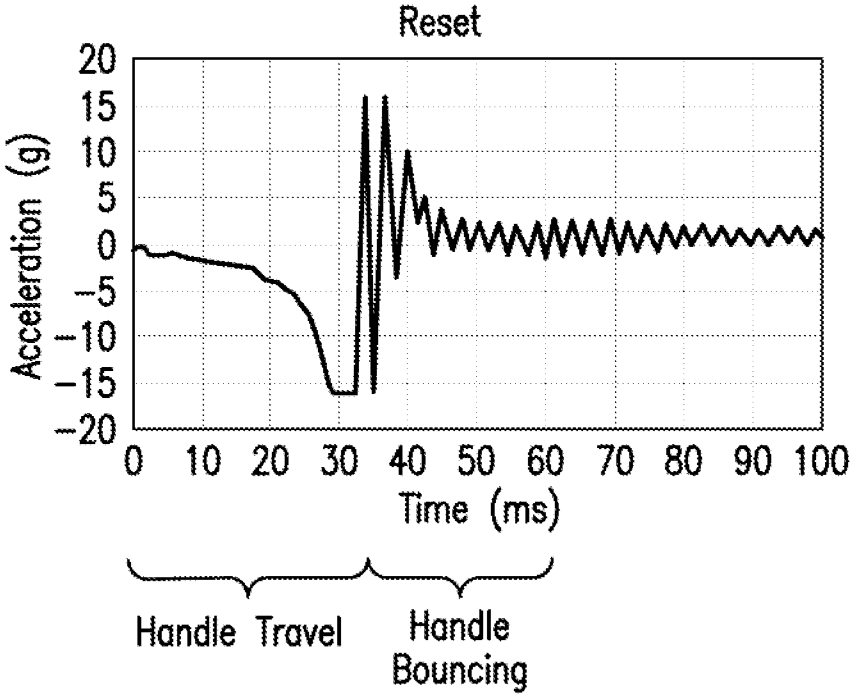

The basic operation of the visual trip indication module 10 algorithm, as illustrated in FIGS. 16A and 6B, will now be described. The electronic components of the visual trip indication module 10 are normally in a low power state 126 block 300 to extend the life of independent power supply 54. At block 304 the waking device 74 sends a wake up signal 75 to the microprocessor 58 and sensing device 76. At block 308 microprocessor 58 and sensing device 76 wake up. At block 312 microprocessor 58 initiates a state machine 122 stored in its memory 62. The state machine 122 has three main states, a low power state 126, a switching state 130 and a tripped state 134.

At block 316 the sensing device 76 sends sensed data to the microprocessor 58, which uses the sensed data provided by sensing device 76 at block 320 to determine which state, switching state 130 or tripped state 134, the circuit breaker 90 is currently in. If, at block 320, the current state of circuit breaker 90 is determined to be the switching state 130 the microprocessor 58 will monitor the voltage of independent power supply 54 at block 324. At block 328 the microprocessor 58 determines the remaining life of the independent power supply 54. If, at block 328, the microprocessor 58 has determined that the remaining life of independent power supply 54 is greater than a predetermined level stored in memory 62, the microprocessor 58, at block 332, will direct a light source 66 to flash a coded signal indicating that the current status of independent power supply 54 is OK and the visual trip indicator module 10 will then return to the low power state 126.

If, at block 328, the microprocessor 58 has determined that the remaining life of independent power supply 54 is less than a predetermined level stored in memory 62, the microprocessor 58, at block 336, will direct a light source 66 to flash a coded signal indicating that the current status of independent power supply 54 is LOW and the visual trip indicator module 10 will then return to the low power state 126. If, at block 320, the current state of circuit breaker 90 is determined to be the tripped state 134 the microprocessor 58, at block 340, will direct the light source 66 to flash a coded signal indicating the tripped state 134 of circuit breaker 90 until the circuit breaker has been reset or for a predetermined period of time after the circuit breaker 90 tripped.

At block 344, after the circuit breaker 90 has been reset, the microprocessor 58 monitors the voltage of independent power supply 54 and at block 348 determines the remaining life of independent power supply 54. If, at block 348, the microprocessor 58 has determined that the remaining life of independent power supply 54 is greater than a predetermined level stored in memory 62, the microprocessor 58, at block 352, will direct the light source 66 to flash a coded signal indicating that the current status of independent power supply 54 is OK and the visual trip indicator module 10 will then return to the low power state 126. If, at block 348, the microprocessor 58 has determined that the remaining life of independent power supply 54 is less than a predetermined level stored in memory 62, the microprocessor 58, at block 356, will direct a light source 66 to flash a coded signal indicating that the current status of independent power supply 54 is LOW and the visual trip indicator module 10 will then return to the low power state 126.

With respect to blocks 324 and 328 of the algorithm above, the microprocessor 58 enters the low power state 126, in which the microprocessor 58 monitors the voltage of independent power supply 54 and determines the remaining life of independent power supply 54 If the monitored voltage is 80% or higher of the rated voltage the independent power supply 54 is OK, if the monitored voltage drops below 80% of the rated voltage the independent power supply 54 is considered LOW. The 80% voltage level indicates that approximately 10% of the expected independent power supply 54 life remains and that the independent power supply 54 should be replaced. The determined remaining life of independent power supply 54 determines how the switching state 130 is indicated by the microprocessor 58 in blocks 332 and 326.

If the current state is determined to be the switching state 130, and the remaining life of independent power supply 54 was determined to be OK by the microprocessor 58, the switching state 130 is visibly indicated by turning on the light source 66 for a short interval (nominally 2 seconds) predetermined period of time. If the remaining life of independent power supply 54 was determined to be LOW by the microprocessor 58, the switching state 130 is visibly indicated by flashing the light source 66 for a predetermined number of flashes over a predetermined time interval (nominally 2 seconds). If there is no visible indication after a switching event the independent power supply 54 is dead or not functioning and should be checked.

It is to be understood that the time periods and number of flashes could be modified as long as the determined remaining life of the independent power supply 54 is clearly communicated to a person viewing the visual indication. The appropriate visual indications described above will be presented to the user/operator each time the circuit breaker is moved from an ON position to an OFF position, or from an OFF position to an ON position After the microprocessor 58 has finished its visual indication of the determined remaining life of the independent power supply 54 the electrical components of the visual trip indicating module 10 will return to the low power state 126.

If the current state is determined to be the tripped state 134 in block 340 of the algorithm above, the microprocessor 58 will initiate continuous flashing of the light source 66 at a predetermined flash length and number of flashes per minute and keep track of the elapsed time since the tripped state 134 was entered. The flashing of light source 66 will continue until a switching state 130 is determined by the microprocessor 58 or the elapsed time reaches a preprogrammed limit, approximately 6 hours (depending on the determined remaining life of the independent power supply 54), at which time microprocessor 58 will enter the low power state 126 and turn off the light source 66. In block 344 a reset of the tripped circuit breaker 90 will be detected as a switching event causing the microprocessor 58 to enter the low power state 126, where the voltage of independent power supply 54 is monitored. At block 348, microprocessor 58 will determine the remaining life of independent power supply 54 and at blocks 352 and 356 the visual indications will be presented to the user/operator as described above for the switching state 130 and the visual trip indicator module 10 will enter the low power state 126. If there is no visible indication from the light source 66 after resetting a tripped circuit breaker 90 the independent power supply 54 is dead or not functioning and should be checked.

In one embodiment, illustrated in FIG. 3, the waking device 74, which wakes up the microprocessor 58 up, is a shock switch 138 and the sensing device 76 is an accelerometer 142. The shock switch 138 must be small enough to fit on the PCB 46 or in the aperture 18, for example a rolling ball or spring shock switch could be used. The microprocessor 58 controls the accelerometer 142 and light source 66 and also measures the voltage of independent power supply 54 and determines its remaining life. The microprocessor 58, waking device 74, sensing device 76 and other electric components are chosen to have extremely low current draw in a low power state 126 to extend the life of independent power supply 54, for instance nominally 30 nA for the microprocessor 58 and 200 nA for all electronic components in the visual trip indicator module 10. The shock switch 138 and the accelerometer 142 are capable of awakening within a short time period, for instance 1 millisecond, in order to capture acceleration events of the circuit breaker handle 86.

The shock switch 138 is configured to wake up the microprocessor 58 when it senses any motion of the circuit breaker handle 86. Upon receiving a wake up command from the shock switch 138 the microprocessor 58 initializes the accelerometer 142. The accelerometer 142 reads accelerations in three axes (X, Y and Z) for a short time duration of approximately 100 milliseconds, which is sufficient to capture the acceleration data 146 of a trip or switching event. The X axis is IN or OUT with respect to a circuit breaker cover 118, the Y axis is UP and DOWN as the breaker handle 86 moves and the Z axis is LEFT or RIGHT. The microprocessor 58 implements the state machine 122, which has three main states, a low power state 126, a switching state 130 and a tripped state 134. The acceleration data 146 captured by accelerometer 142, is compared with a set of stored acceleration profiles 150 (FIGS. 17A-17D) by microprocessor 58.

As illustrated in FIGS. 17A-17D, the acceleration profile 150 for each event, turning ON, turning OFF, tripping and resetting, is unique. If the acceleration data 146 fits within the stored acceleration profile 150 for a tripping event, illustrated in FIG. 17 C, the microprocessor 58 enters the tripped state 134. If the acceleration data 146 fits within the stored acceleration profile 150 for a switching event, ON (FIG. 17A) or OFF (FIG. 17B), the microprocessor 58 enters the switching state 130. If the acceleration data 146 does not fit within the acceleration profile 150 for either of the switching state 130 or the tripped state 134, the microprocessor 58 stays in its current state and initiates the appropriate visual indication sequence for the determined current state as describe above.

Figure 7:
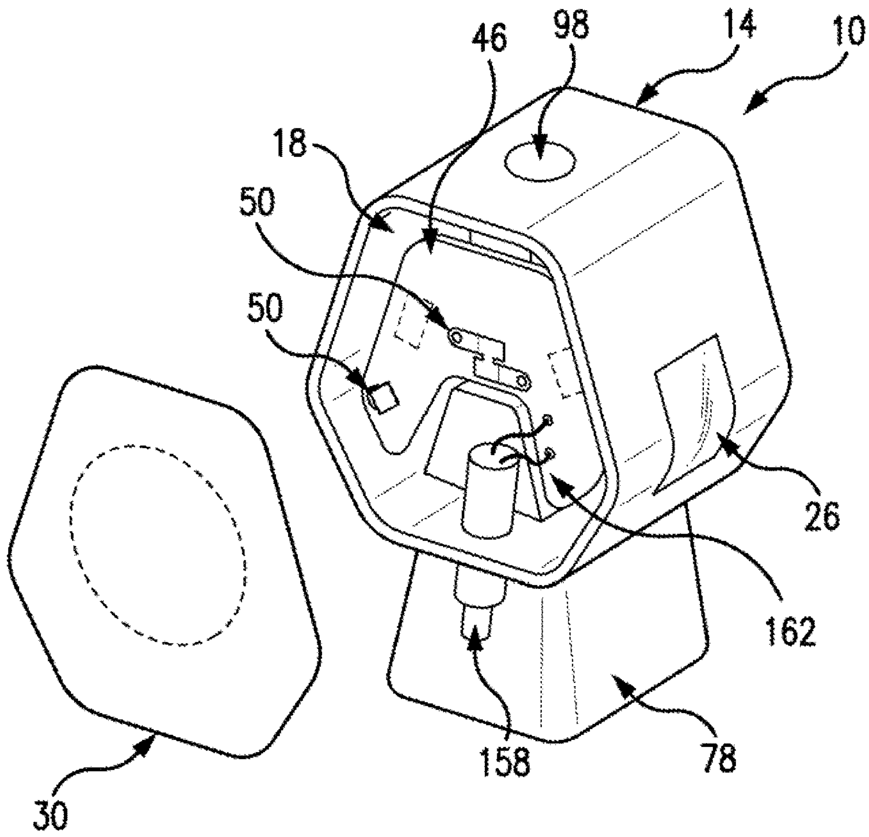
FIG. 7 illustrates a visual trip indication module configured with a microswitch sensing device, according to one embodiment described herein.

In another embodiment illustrated in FIGS. 7 and 8 the waking device 74 and sensing device 76 are combined in a microswitch 154 that is fixed in the aperture 18 adjacent the PCB 46 such that its plunger 158 engages the circuit breaker cover 118 in the ON and OFF positions of the circuit breaker handle 86 but not in the tripped position of the circuit breaker handle 86. Any movement of the circuit breaker handle 86 from one of the ON or OFF positions to the other ON or OFF position, which generally takes about 50 ms, will cause a brief change in state of the microswitch 154 and thereby wake up the microprocessor 58. Movement from the ON position to the tripped position will also wake up the microprocessor 58. The microprocessor 58 will determine the current state, switching state 130 or tripped state 134, and proceed with visually indicating the current state as described in the basic operation above.

In a similar embodiment illustrated in FIG. 8, two microswitches 154 are fixed in the aperture 18 adjacent the PCB 46 such that the plunger 158 of one microswitch 154 engages the circuit breaker cover 118 in the ON position of the circuit breaker handle 86 but not in the tripped position of the circuit breaker handle 86 and the plunger 158 of the other microswitch 154 engages the circuit breaker cover 118 in the OFF position of the circuit breaker handle 86 but not in the tripped position of the circuit breaker handle 86. Once the microprocessor 58 has determine the current state, switching state 130 or tripped state 134, it will proceed with visually indicating the current state as described in the basic operation above.

In another embodiment illustrated in FIGS. 9-12, the waking device 74 is a timer 63 located in the microprocessor 58 and the sensing device 76 is a combination of a modulated light source 162 and light sensor 166, both residing in the aperture 18. The modulated light source 162 and light sensor 166 being fixed in one or both of the angled surfaces 106 in a manner similar to the microswitches 154 of FIGS.

7 and 8 such that light from the modulated light source 162 shines outwardly from the aperture 18. The light emitted by the modulated light source 162 hits a reflector 178 located on the circuit breaker cover 118 such that reflected light 182 from the light source 162 can be detected by the light sensor 166. The modulated light source 162 and light sensor 166 can also be fixed in an intermediate surface 186 between the two angular surfaces 106.

The reflector 178 can be installed on or in the breaker cover 118 during assembly of the circuit breaker 90 or during a retrofit installation of the trip indication module 10 on a circuit breaker 90 in the field. The reflector 178 can be a mirror or any mirror-like reflective material, such as reflective tape, that can be installed on a circuit breaker cover 118. The modulated light source 162 is pulsed ON and OFF by the microprocessor 58 such that the ON pulse is sufficiently long enough (approximately 1 ms) to quickly detect a change in state of the circuit breaker 90 and the OFF pulse is sufficiently long enough (approximately 1-5 seconds depending on the state of the independent power supply 54) to extend the life of independent power supply 54. Since the ON pulse of the modulated light source 162 is controlled by the microprocessor 58, the microprocessor 58 is expecting a response from the light sensor 166 immediately after the ON pulse is executed. The microprocessor 58 can be configured to be awakened and initiate the state machine 122 by either of the detection of a reflected light 182 or no detection of a reflected light 182 or a timer 63 in the microprocessor 58. Once the microprocessor 58 has determine the current state, switching state 130 or tripped state 134, it will proceed with visually indicating the current state as described in the basic operation above.

Figure 13:
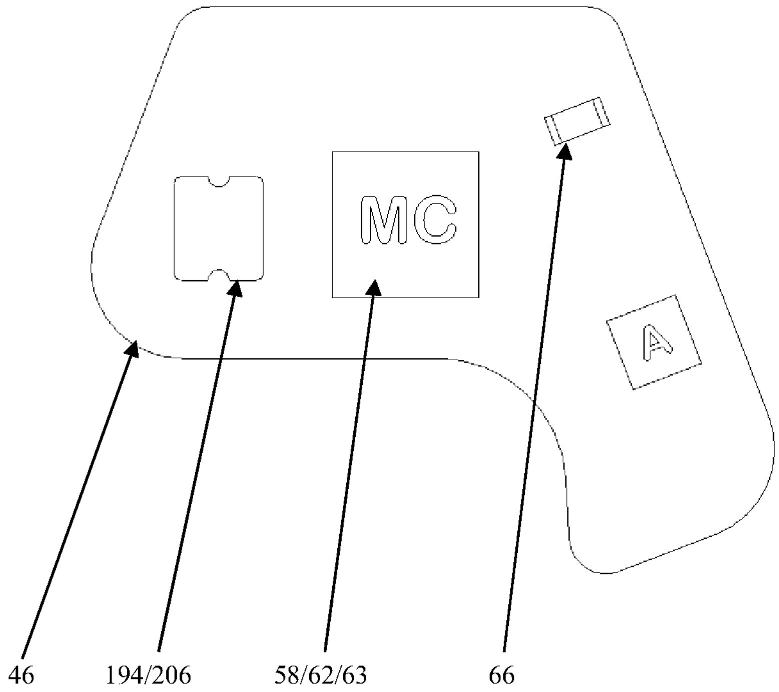
FIG. 13 illustrates a visual trip indication module with a sensing device comprising a combination of a magnet and at least one of a magnetic sensor and a Hall-effect sensor, according to one embodiment described herein.
Figure 14:
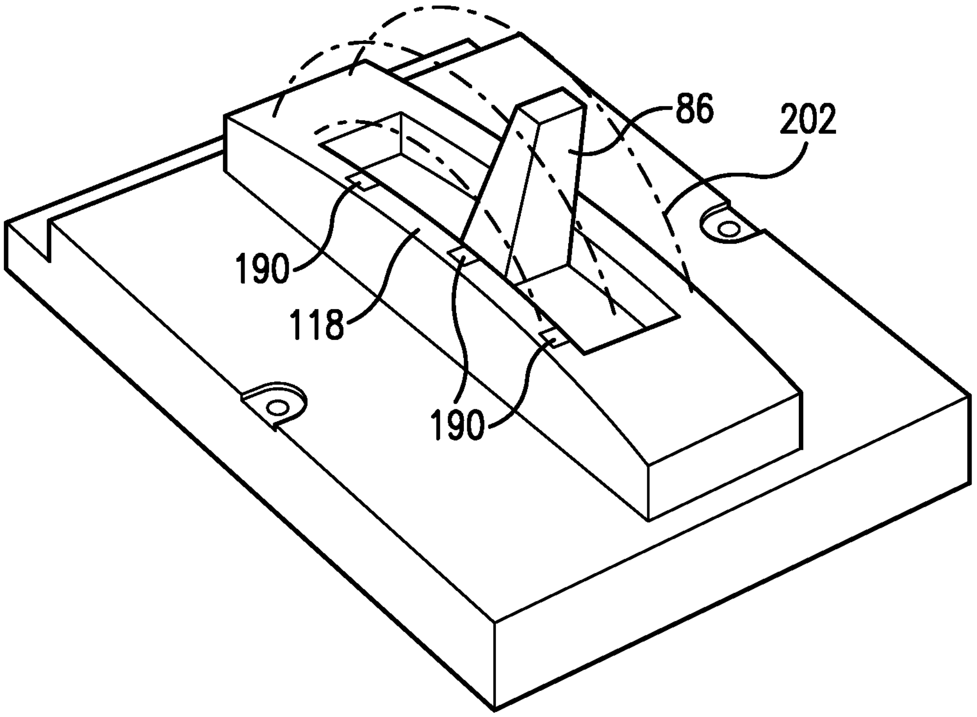
FIG. 14 illustrates a visual trip indication module with a sensing device comprising a combination of a magnet and at least one of a magnetic sensor and a Hall-effect sensor, according to one embodiment described herein.

In another embodiment illustrated in FIGS. 13-14, the waking device 74 is a timer 63 located in the microprocessor 58 and the sensing device 76 is a combination of a magnet 190 located in or on the breaker cover 118 and a 3D magnetic sensor 194 located on the PCB 46 in aperture 18. The magnet 190 can be placed adjacent any of the three circuit breaker handle 86 positions (ON, OFF or TRIPPED). In retrofit applications the magnet 190 can be attached to the circuit breaker cover 118 by a fast setting glue having superior adhesion and an alignment guide 198, illustrated in FIG. 15, can provide proper alignment with the three circuit breaker handle 86 positions.

The alignment guide 198 can be made from a thin flexible material. The 3D magnetic sensor 194 detects a magnetic field 202 generated by the magnet 190 and can determine movement of the trip indication module 10 with respect to the magnet 190 and the distance and direction from the 3D magnetic sensor 194 to the magnet 190. The detected movement wakes the microprocessor 58, which initiates the state machine 122. The microprocessor 58 uses the detected distance and direction to determine the current state of the circuit breaker 90, switching state 130 or tripped state 134, and will proceed with visually indicating the current state of circuit breaker 90 and the current state of independent power supply 54 as described in the basic operation above.

In another embodiment, which is similar to the 3D magnetic sensor 194 embodiment above and also illustrated in FIGS. 13 and 14, the waking device 74 is a timer 63 located in the microprocessor 58 and the sensing device 76 is a combination of a magnet 190 located in or on the breaker cover 118 and a Hall-effect sensor 206 located on the PCB 46. As in the 3D magnetic sensor 194 above, one or more magnets 190 can be placed adjacent any one of or all of the three circuit breaker handle 86 positions (ON, OFF or TRIPPED). Any movement with respect to the magnets 190 detected by the Hall-effect sensor 206 will wake up the microprocessor 58, which initiates the state machine 122. The Hall-effect sensor 206 measures the intensity of a magnetic field 202 generated by the closest magnet(s) 190 and derives a Hall-voltage. The Hall-voltage is different for each of the three positions, (ON, OFF and TRIPPED) of the circuit breaker handle 86.

Figure 15:
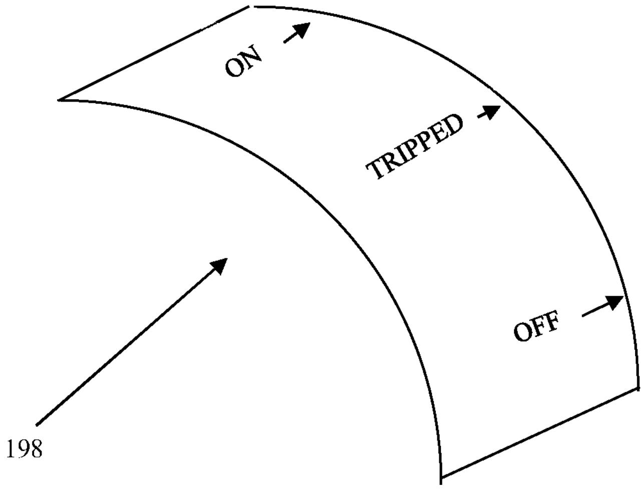
FIG. 15 illustrates an alignment guide used for positioning magnets on the circuit breaker cover when installing a visual trip indication module on a circuit breaker, according to one embodiment described herein.

The microprocessor 58 compares the current Hall-voltage with threshold voltages previously stored in memory 62 for each of the three circuit breaker handle 86 positions. Based on this comparison the current circuit breaker handle 86 position is identified by the microprocessor 58 and the appropriate state, switching state 130 or tripped state 134, of the circuit breaker 90 is initiated. The microprocessor 58 will proceed with visually indicating the current state of circuit breaker 90 and the current state of independent power supply 54 as described in the basic operation above. In retrofit applications the magnet 190 can be attached to the circuit breaker cover 118 by a fast setting glue having superior adhesion and an alignment guide 198 will provide proper alignment with the three circuit breaker handle 86 positions. The alignment guide 198 can be made from a thin flexible material as shown in FIG. 15.

Figure 18:
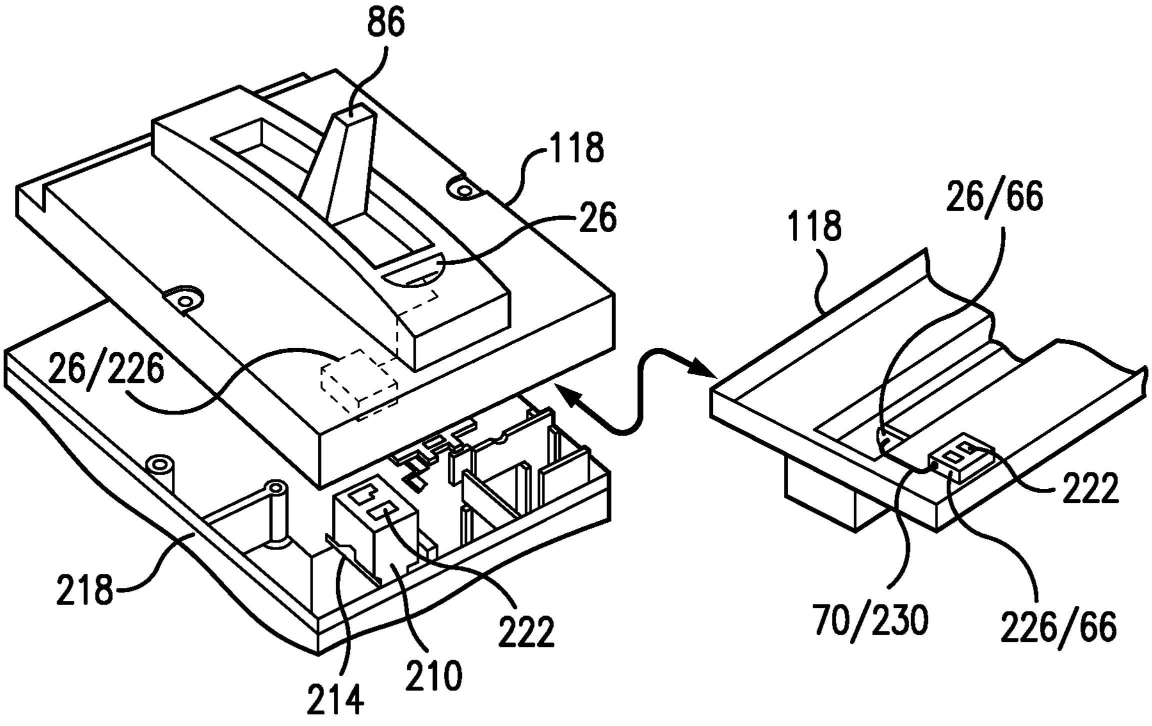
FIGS. 18 and 19 illustrate embodiments wherein the waking device, sensing device, electronics, independent power source and light source are enclosed withing the circuit breaker housing, according to one embodiment described herein.
Figure 19:
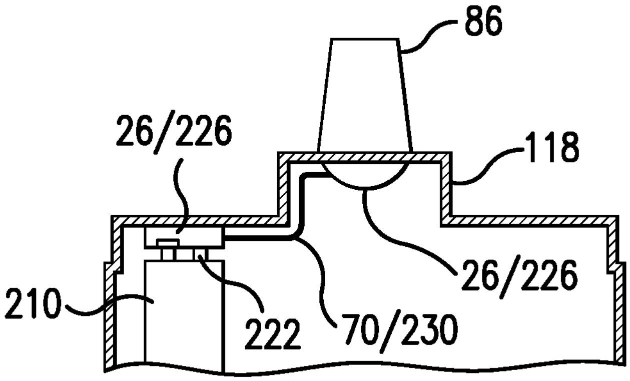

In another embodiment illustrated in FIGS. 18 and 19, all of the components of some of the above embodiments can be located inside the circuit breaker housing 218. Examples of these embodiments could include those using a waking device 74 and accelerometer 142, microswitches 154 and magnets 190. The electronic elements can be enclosed in a small removable electronics enclosure 210, which can be slidably received in a pocket 214 formed in the circuit breaker housing 218. The electronics enclosure 210 has electrical terminals 222 for providing power from an independent power supply 54 located in the electronics enclosure 210 to a terminal block 226 located on the inside surface of the circuit breaker cover 118.

A light source 66 can be located in the terminal block 226 and connected to the indicator lens 26 by a light pipe 70 or located on the inside surface of the circuit breaker cover 118 adjacent to the indicator lens 26 and connected to the terminal block 226 by an electrical conductor 230. The visible indicator lens 26 is located in the circuit breaker cover 118 such that it is easily visible when looking at an installed circuit breaker 90. Other components such as the microswitches 154 and magnets 190 will be located at various locations inside the circuit breaker housing 218 where they can provide data to the microprocessor 58 relevant to the position of and movement of the circuit breaker handle 86. The locations generally require one element to be in a fixed position with respect to another element that moves as the circuit breaker handle 86 moves from between the ON and OFF positions and between the TRIPPED and RESET positions.

The microprocessor 58 directs the light source 66 to flash a coded signal indicating the TRIPPED state 134 of the circuit breaker 90 and, after resetting the circuit breaker 90, flashing a coded signal indicating the current state of the independent power supply 54. In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A visible circuit breaker trip indicator comprising:
- a circuit breaker having a handle for operating the circuit breaker between a plurality of predefined states;
- a microprocessor;
- a sensing device for sensing an event of the circuit breaker;
- a light source;
- a memory containing computer program code configured to maintain a state machine indicating a current state of the circuit breaker and configured to update the current state of the state machine based on event data received from the sensing device and further configured to selectively activate the light source based on the current state of the state machine to flash a coded signal indicating the current state of the circuit breaker; and
- an independent power supply providing power to at least one of the microprocessor, the light source, the sensing device and the memory,
- wherein the microprocessor and associated memory, sensing device, light source, and independent power supply are located on, or connected to, a printed circuit board (PCB) that is (1) enclosed in an aperture defined in a visible circuit breaker trip indicator module that is attachable to the circuit breaker handle or (2) located in a pocket defined by a circuit breaker housing.

2. The visible circuit breaker trip indicator of claim 1, wherein the sensing device is an accelerometer.

3. The visible circuit breaker trip indicator of claim 1, wherein the sensing device is a microswitch.

4. The visible circuit breaker trip indicator of claim 1, wherein the sensing device is a combination of a modulated light source and a light sensor.

5. The visible circuit breaker trip indicator of claim 1, wherein the sensing device is a magnet and a magnetic sensor.

6. The visible circuit breaker trip indicator of claim 1, wherein the sensing device is a magnet and a Hall-effect sensor.

7. The visible circuit breaker trip indicator of claim 1,
- wherein the microprocessor and the sensing device are normally in a low power state and are awakened by a waking device, the waking device sending an activation signal to the microprocessor and sensing device in response to an event in the circuit breaker, wherein the waking device is an accelerometer, a shock switch, a timer or a microswitch.

8. The visible circuit breaker trip indicator of claim 7 wherein the waking device is the timer which is located in the microprocessor.

9. The visible circuit breaker trip indicator of claim 1, wherein the remaining life of the independent power supply is determined by the microprocessor, the microprocessor directing the light source to flash the coded signal indicating whether the remaining life of the independent power supply is either greater than or less than a predetermined level.

10. The visible circuit breaker trip indicator of claim 1, wherein the circuit breaker handle is manually operated from an ON position to an OFF position, from the OFF position to the ON position and from a TRIPPED position to a RESET (OFF) position.

11. The visible circuit breaker trip indicator of claim 1, further comprising:

the visible circuit breaker trip indicator module including a module housing, which defines the aperture, for housing or retaining at least the microprocessor, the sensing device or component thereof, the light source, a waking device and the memory.

12. The visible circuit breaker trip indicator of claim 1, wherein the PCB is enclosed in the aperture defined in the visible circuit breaker trip indicator module that is attachable to the circuit breaker handle, and the visible circuit breaker trip indicator module is field retrofittable for an existing circuit breaker.

13. The visible circuit breaker trip indicator of claim 1, further comprising:

a visible indicator lens, wherein the light source is on the PCB such that the light source is adjacent a portion of the visible indicator lens or a portion of the visible indicator lens acting as a light pipe.

14. A visible circuit breaker trip indicator module comprising:

a trip indicator module housing configured to be slidably received on a circuit breaker handle of a circuit breaker, the circuit breaker handle operating the circuit breaker between a plurality of predefined states;

an aperture defined by the trip indicator module housing, the aperture receiving electronic and mechanical components of the visible circuit breaker trip indicator module;

a printed circuit board on which the electronic components are mounted or electrically connected to;

a sensing device for sensing an event of the circuit breaker;

a light source;

a microprocessor having an associated memory and configured with computer program code configured to maintain a state machine representing state transitions of the circuit breaker and configured to update a current state of the state machine based on event data received from the sensing device and configured to selectively illuminate the light source based on the current state of the state machine, thereby visibly displaying a coded signal indicating a current state of the circuit breaker;

a waking device for waking the microprocessor and sensing device from a low power state;

an independent power supply for powering at least one of the printed circuit board, the sensing device, the waking device, the light source, the microprocessor and the associated memory; and an aperture cover for closing the aperture.

15. A method for visibly indicating a tripped state of a circuit breaker comprising:

awakening, from a low power state, by a waking device, a microprocessor having an associated memory and a sensing device;

initiating, by the microprocessor, a state machine stored in the memory;

sensing, by the sensing device, events in the circuit breaker;

determining, by the microprocessor, using information from the sensing device and an algorithm stored in the memory, the current state of the state machine;

selectively activating a light source based on the current state of the state machine to flash a coded signal indicating the current state of the circuit breaker;

returning to the low power state; and providing power to at least one of the microprocessor, the light source, the sensing device and the memory from an independent power supply, wherein the microprocessor and associated memory, sensing device, light source, waking device and independent power supply are located on, or connected to, a printed circuit board (PCB) that is (1) enclosed in an aperture defined in a visible circuit breaker trip indicator module that is attachable to a circuit breaker handle or (2) located in a pocket defined by a circuit breaker housing.

16. The method of claim 15, wherein the sensing device is an accelerometer or a microswitch.

17. The method of claim 15, wherein the sensing device is a combination of a modulated light source and a light sensor.

18. The method of claim 15, wherein the sensing device is a magnet and a magnetic sensor.

19. The method of claim 15, wherein the sensing device is a magnet and a Hall-effect sensor.

20. The method of claim 15, wherein the microprocessor and the sensing device are normally in a low power state and are awakened by the waking device, the waking device sending an activation signal to the microprocessor and sensing device in response to an event in the circuit breaker, wherein the waking device is an accelerometer, a shock switch, a timer, or a microswitch.

21. The method of claim 20 wherein the waking device is the timer which is located in the microprocessor.

22. The method of claim 20, wherein the microprocessor and associated memory, sensing device, light source, waking device and independent power supply are located on, or connected to, the PCB that is enclosed in an aperture defined in the visible circuit breaker trip indicator module.

23. The method of claim 22, wherein the visible circuit breaker trip indicator module is field retrofittable for an existing circuit breaker.

24. The method of claim 15, wherein the remaining life of the independent power supply is determined by the microprocessor, the microprocessor directing the light source to flash the coded signal indicating whether the remaining life of the independent power supply is either greater than or less than a predetermined level.

25. The method of claim 15, wherein the microprocessor and associated memory, sensing device, light source, waking device and independent power supply are located on or connected to the printed circuit board located in the pocket defined by the circuit breaker housing.

26. The method of claim 15, wherein the visible circuit breaker trip indicator module includes a module housing, which defines the aperture, for housing or retaining at least the microprocessor, the sensing device or component thereof, the light source, the waking device and the memory.

27. The method of claim 15, wherein the PCB is enclosed in the aperture defined in the visible circuit breaker trip indicator module that is attachable to the circuit breaker handle, and the visible circuit breaker trip indicator module is field retrofittable for an existing circuit breaker.

* * * * *